Sept. 17, 1940.   H. C. ICKES   2,214,903
METHOD OF MAKING INNER TUBES
Filed Oct. 29, 1938
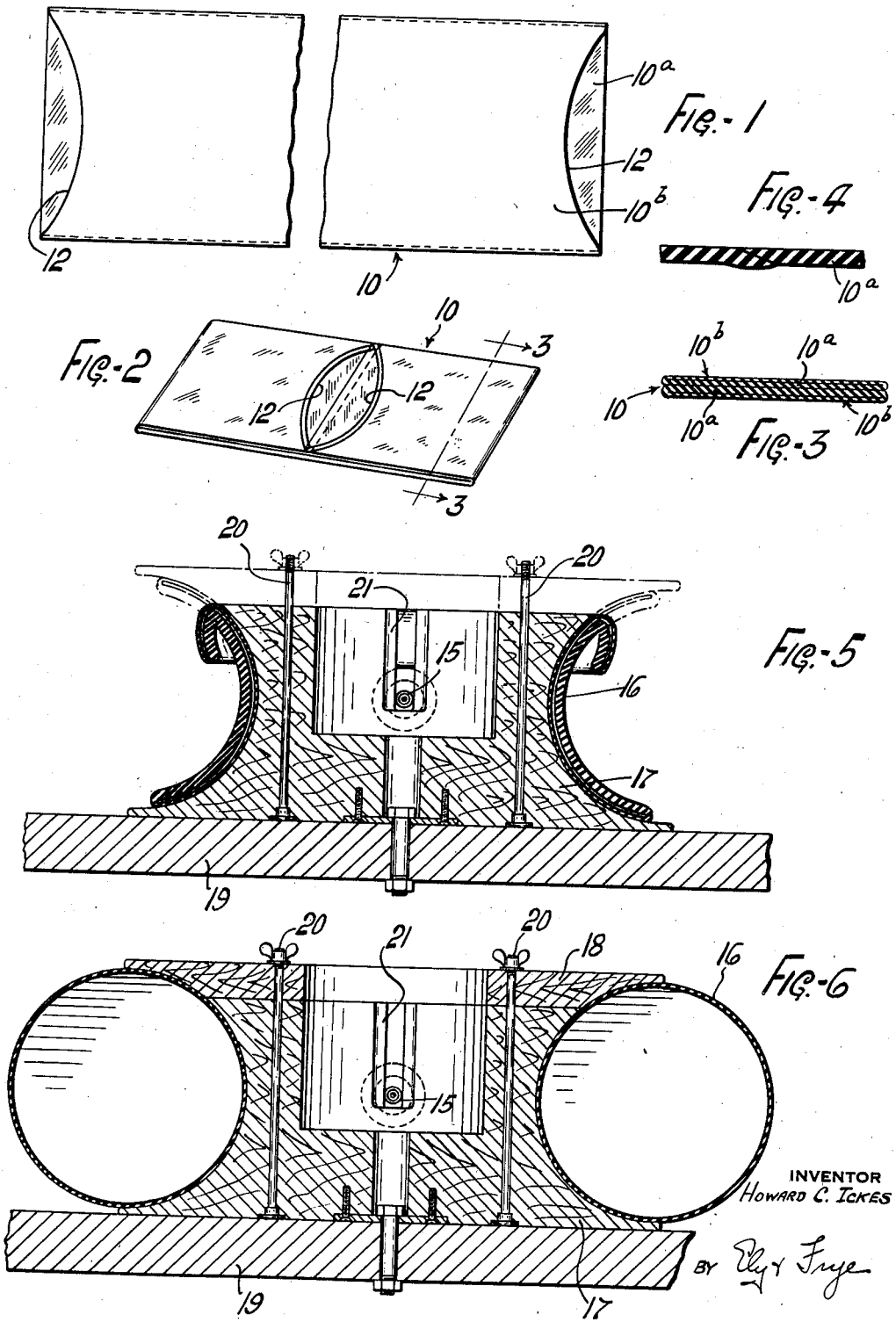

Patented Sept. 17, 1940

2,214,903

UNITED STATES PATENT OFFICE 2,214,903

METHOD OF MAKING INNER TUBES

Howard C. Ickes, Akron, Ohio, assignor to The Firestone Tire & Rubber Company, Akron, Ohio, a corporation of Ohio Application October 29, 1938, Serial No. 237,680

9 Claims. (Cl. 154—14)

This invention relates to methods of making inner tubes, and more especially it relates to improved procedure for the manufacture of inner tubes of relatively larger cross-sectional diameter and relatively small rim diameter.

The invention is of primary utility in the manufacture of inner tubes for airplane tires, which tubes have dimensions of the proportions mentioned. In the manufacture of inner tubes for airplane tires by prior methods, it has been common practice to assemble the tube from four unvulcanized rubber parts, namely, a tread or peripheral portion, a hub or inside circumference portion, and two lateral or sidewall portions. The several parts required to be cut to size, and assembled by means of lapped, circumferential seams before vulcanization. The method was wasteful and inconvenient, required excessive time and labor, and had other unsatisfactory features. Ordinary inner tubes, such as are used in the tires of automobiles, may be made from a straight length of rubber tubing by joining the ends therof to produce an endless inflatable structure, but this method heretofore has been found impracticable for inner tubes of small inside diameter due to the fact that in bending the tubes to annular form the inner circumferential surface thereof will buckle, or the outside circumference will be too short because of the greater distance around the outside of the tube.

The chief objects of this invention are to effect economy of time and labor in the manufacture of inner tubes of the character mentioned; and to produce a superior inner tube as the result of fewer splices therein. Other objects will be manifest as the specification proceeds.

Of the accompanying drawing:

Figure 1 is a plan view of a length of unvulcanized rubber tube stock, the ends thereof being trimmed or beveled in a manner peculiar to this invention;

Figure 2 is a perspective view of the structure shown in Figure 1, in folded condition, in the initial phase of the splicing operation;

Figure 3 is a section on the line 3—3 of Figure 2;

Figure 4 is a section, on a larger scale, showing a lapped splice such as is employed for joining the tube-ends;

Figure 5 is a diametric section of a forming ring, and a spliced tube thereon, as they appear in the initial phase of shaping the tube prior to vulcanization; and Figure 6 is a section of the elements shown in Figure 5 as they appear in the final phase of shaping preparatory to vulcanization.

Briefly stated, the method of the present invention comprises forming a one-piece, flattened tube of unvulcanized rubber composition, and trimming the respective ends thereof so that that side of the tube that eventually becomes the inner circumference of the finished inner tube is shorter than the side of the tube that eventually becomes the periphery of the inner tube. The ends of the tube are then joined or spliced to provide an annular tubular structure, a valve stem is mounted therein, after which the tube is mounted upon an annular form having a grooved perimeter. The tube is then slowly inflated to distend its peripheral portion and to bring the tube substantially to ultimate size and shape. Thereafter the tube is removed from the form, mounted in a vulcanizer, and vulcanized under heat and internal pressure in the usual manner.

Referring to the drawing, there is shown in Figure 1 a flattened tube 10 of unvulcanized rubber composition, which tube conveniently is produced by extrusion. The tube consists of a portion 10a that is relatively thick, and a portion 10b that is substantially thinner, being approximately the same thickness as the wall of a finished inner tube. As an example of the relative thicknesses of the stock, one tube structure has a thick wall of .292" thickness and a thin wall of .126" thickness. The tube 10 is flattened so that the thick wall 10a constitutes one ply thereof and the thin wall 10b constitutes the other ply thereof. As shown in Figure 1, the thin wall of the tube 10 is uppermost.

The first step in the manufacture of an inner tube from the flattened structure 10 is the cutting away of chordal-shaped sections from the respective end portions of the thin ply 10b thereof, the ends thereof thereafter presenting concave margins 12 as shown. The ends of the structure are then skived or beveled, which skives are on the exterior of the structure at each end thereof. The ends of the structure are then buffed, one end being buffed on the outside of the structure, and the other end being buffed on the inner face of the structure. In the subsequent splicing of the tube-ends the buffed surfaces are brought together in face to face relation.

In the splicing of the tube 10, the position thereof is reversed from the position shown in Figure 1, so that the thicker ply 10a is uppermost. Then the ends of the tube are folded over the top of the structure and the transversely-straight end margins of ply 10a are brought together in overlapping relation and pressed together, the usual hydrocarbon solvent being used to obtain improved cohesion of the contacting surfaces. This condition of the tube is shown in Figure 2, a section of the splice being shown in Figure 4. Thereafter the folds at the ends of the structure shown in Figure 2 are lifted to obtain slack in the upper ply 10b, and the arcuate ends 12 thereof are brought together in lapped relation and spliced, thus producing an endless tubular structure. The tube structure is then reversed, that is, it is turned so that the thicker wall 10a thereof is outermost, after which a valve stem 15, Figures 5 and 6, is mounted in its thinner wall 10b in the usual manner. The tube, hereinafter designated 16, is then ready for the forming operation.

The forming or shaping of the tube is effected by means of the forming device shown in Figures 5 and 6. Said device consists of an annular structure having a grooved perimeter and divided into a lower major portion 17, and an upper minor portion 18, the line of division being parallel to the plane of the device, and somewhat above the region of its minimum outside diameter. The forming device may be secured to a table or other suitable support 19, and the upper portion 18 is detachably secured to the lower portion 17 by bolts 20, 20. Lower portion 17 of the device is formed with a radial slot 21 that extends downwardly from its top face, said slot being provided for receiving the valve stem 15 of the tube structure 16. The forming device as shown is made of wood, but it may be made of other material, such as metal, if desired.

The tube structure 16 is mounted upon the forming device while the upper portion 18 is removed from lower portion 17, as shown in Figure 5. Best results are obtained when the inside diameter of the tube structure 16 is of such size as to require it to be slightly stretched in passing the upper margin of form-part 17. The tube structure is worked downwardly about the latter, its lower, folded marginal portion being thereby stretched by reason of increasing diameter of the form-groove toward the bottom of the form. After the tube structure attains the position where its centerline is coincident with the central plane of the form, that portion of the tube structure that extends above form-portion 17 is folded downwardly upon itself, as shown in Figure 5, thereby enabling upper portion 18 of the form to be mounted upon and clamped to portion 17, the form then appearing as in Figure 6. Thereafter the folded down portion of tube structure is folded back against the form-portion 18, as indicated in broken lines in Figure 5, after which the tube is ready for inflation.

The tube is inflated gradually, that is, by a succession of increments, time being allowed between increments to permit stretching of the rubber stock. Inflation of the tube forces the thicker, outer ply 10a thereof from the concave form shown in Figure 5 to convex form so that the tube attains the transversely circular shape shown in Figure 6. This change in shape of ply 10a of the tube causes a stretching or distension thereof, with the result that said ply is materially reduced in thickness. Preferably the initial thickness of tube-walls 10a, 10b, is such that after the tube has been inflated on the forming device, the tube walls are of equal gauge or thickness. In the forming of the tube as described, it is distended until its outside diameter is nearly as large as the outside diameter of the mold cavity in which the tube subsequently is vulcanized.

The tube is vulcanized by removing it from the forming device, while still in inflated condition, and mounting it in the molding cavity of a vulcanizer, said molding cavity being slightly larger than the inflated tube, both in outside diameter and inside diameter, to enable the tube easily to be placed in the vulcanizer. Thereafter the tube is vulcanized by heat, and by internal pressure sufficient to force it into conformity with the walls of the molding cavity, as is well understood in the art.

The invention results in a saving of time and labor, it reduces the cost of the tubes, it produces a superior article, and achieves the other advantages contemplated by the statement of objects. The invention is applicable to the manufacture of tubes of various sizes and proportions, experience having shown the practicability of stretching the thicker, peripheral wall of the tube at least to the extent of 150 per cent.

Modification may be resorted to without departing from the spirit of the invention, or the scope thereof as defined by the appended claims.

What is claimed is:

1. The method of making inner tubes which comprises forming a length of flattened unvulcanized rubber tubing consisting of two separable plies joined along their lateral margins, shortening one ply thereof with relation to the other ply, splicing the ends of the tubing to produce an endless tube with the shortened ply on the inner circumference thereof, distending the endless tube, and vulcanizing the tube while it is so distended.

2. The method of making inner tubes which comprises forming a length of flattened unvulcanized rubber tubing consisting of two separable plies joined along their lateral margins, shortening one ply thereof with relation to the other ply by removing stock from the respective ends of the tubing, splicing the ends of the tubing to produce an endless tube with longer outer circumference than inner circumference, distending the tube, and vulcanizing the tube while distended.

3. The method of making inner tubes which comprises forming a length of flattened unvulcanized rubber tubing consisting of two separable plies joined along their lateral margins, shortening one ply thereof by removing chordal-shaped pieces from the respective ends thereof, splicing the ends of the tubing to produce an endless tube with greater outer circumference than inner circumference, distending the tube, and vulcanizing the tube while distended.

4. The method of making inner tubes which comprises forming a length of flattened unvulcanized rubber tubing having one relatively thick ply and one relatively thin ply, shortening the length of the thinner ply as compared to the thicker ply, splicing the ends of the tubing to provide an endless tube, distending the tube with the thicker ply on the periphery thereof, and vulcanizing the tube while distended.

5. The method of making inner tubes which comprises forming a length of flattened unvulcanized rubber tubing having a relatively thick ply and a relatively thin ply, shortening the length of the thinner ply by removing stock from the ends thereof to produce concavely arcuate end margins, splicing the ends of the tubing to produce an endless tube, distending the tube with the thicker ply on the periphery thereof, and vulcanizing the tube while distended.

6. The method of making inner tubes which comprises forming a length of flattened unvulcanized rubber tubing having a relatively thick ply and a relatively thin ply, trimming the respective ends thereof in such a manner than the mean length of the thicker ply is greater than the mean length of the thinner ply, splicing the ends of the tubing to produce an endless tube with the thicker ply on the periphery thereof, inflating the tube to distend the same while limiting the distension of the inner circumference thereof, and vulcanizing the tube while distended.

7. The method of making inner tubes which comprises forming a length of flattened unvulcanized rubber tubing having a relatively thick ply and a relatively thin ply, trimming the respective ends of the tubing in such a manner that the mean length of the thicker ply is greater than the mean length of the thinner ply, splicing the ends of the tubing to produce an endless tube with the thicker ply outermost, stretching the tube into conformity with an annular grooved support, inflating the tube while so supported to distend the periphery thereof, and vulcanizing the tube while distended.

8. The method of making inner tubes which comprises forming a length of flattened unvulcanized rubber tubing having a relatively thick ply and a relatively thin ply, trimming the respective ends of the tubing in such a manner that the mean length of the thicker ply is greater than the mean length of the thinner ply, splicing the ends of the tubing to provide an endless tube with the thicker ply outermost, inflating the tube to distend the tube nearly to its ultimate dimensions, and then confining the tube and vulcanizing the same by heat while under internal pressure that causes further distending of the tube.

9. A method as defined in claim 8 in which the initial inflation of the tube is effected while the inner circumference thereof is free to distend only to a limited extent while the distension of the outer circumference is unrestrained.

HOWARD C. ICKES.